United States Patent
Motz

(10) Patent No.: US 6,216,071 B1
(45) Date of Patent: Apr. 10, 2001

(54) APPARATUS AND METHOD FOR MONITORING AND COORDINATING THE HARVESTING AND TRANSPORTING OPERATIONS OF AN AGRICULTURAL CROP BY MULTIPLE AGRICULTURAL MACHINES ON A FIELD

(75) Inventor: Darin S. Motz, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/213,076

(22) Filed: Dec. 16, 1998

(51) Int. Cl.$^7$ .................................................. G06F 19/00
(52) U.S. Cl. ................................ 701/50; 702/5; 340/988; 56/1
(58) Field of Search ........................ 701/50, 212, 207; 702/5; 340/988; 56/1

(56) References Cited

U.S. PATENT DOCUMENTS

| | | | |
|---|---|---|---|
| 5,282,389 | 2/1994 | Faivre et al. | 73/861.73 |
| 5,471,391 | 11/1995 | Gudat et al. | 364/424.07 |
| 5,529,537 | 6/1996 | Johnson | 460/6 |
| 5,575,316 | 11/1996 | Pollklas | 141/198 |
| 5,646,844 | 7/1997 | Gudat et al. | 364/449.2 |
| 5,666,793 | 9/1997 | Bottinger | 56/10.2 R |
| 5,684,476 | 11/1997 | Anderson et al. | 340/988 |
| 5,712,782 | 1/1998 | Weigelt et al. | 701/50 |
| 5,902,343 | * 5/1999 | Hale et al. | 701/50 |

FOREIGN PATENT DOCUMENTS

| | | |
|---|---|---|
| 197 05 842 | 8/1998 | (DE) . |
| 0821296 | 1/1998 | (EP) . |

* cited by examiner

Primary Examiner—William A. Cuchlinski, Jr.
Assistant Examiner—Arthur D. Donnelly
(74) Attorney, Agent, or Firm—Marla L. Hudson; Howard & Howard

(57) ABSTRACT

An apparatus and method for monitoring and coordinating the harvesting and transporting operations of an agricultural crop by multiple agricultural machines on a field is disclosed. The apparatus includes a first position determining system located on a first agricultural machine, a site database for storing a dynamic model of the field, and a harvest volume indicating system located on the first agricultural machine. A control system receives information from the first position determining system, the site database, and the harvest volume indicating system, and responsively determines an expected time at which the harvested crop will reach a predetermined desired level on the first agricultural machine.

42 Claims, 6 Drawing Sheets

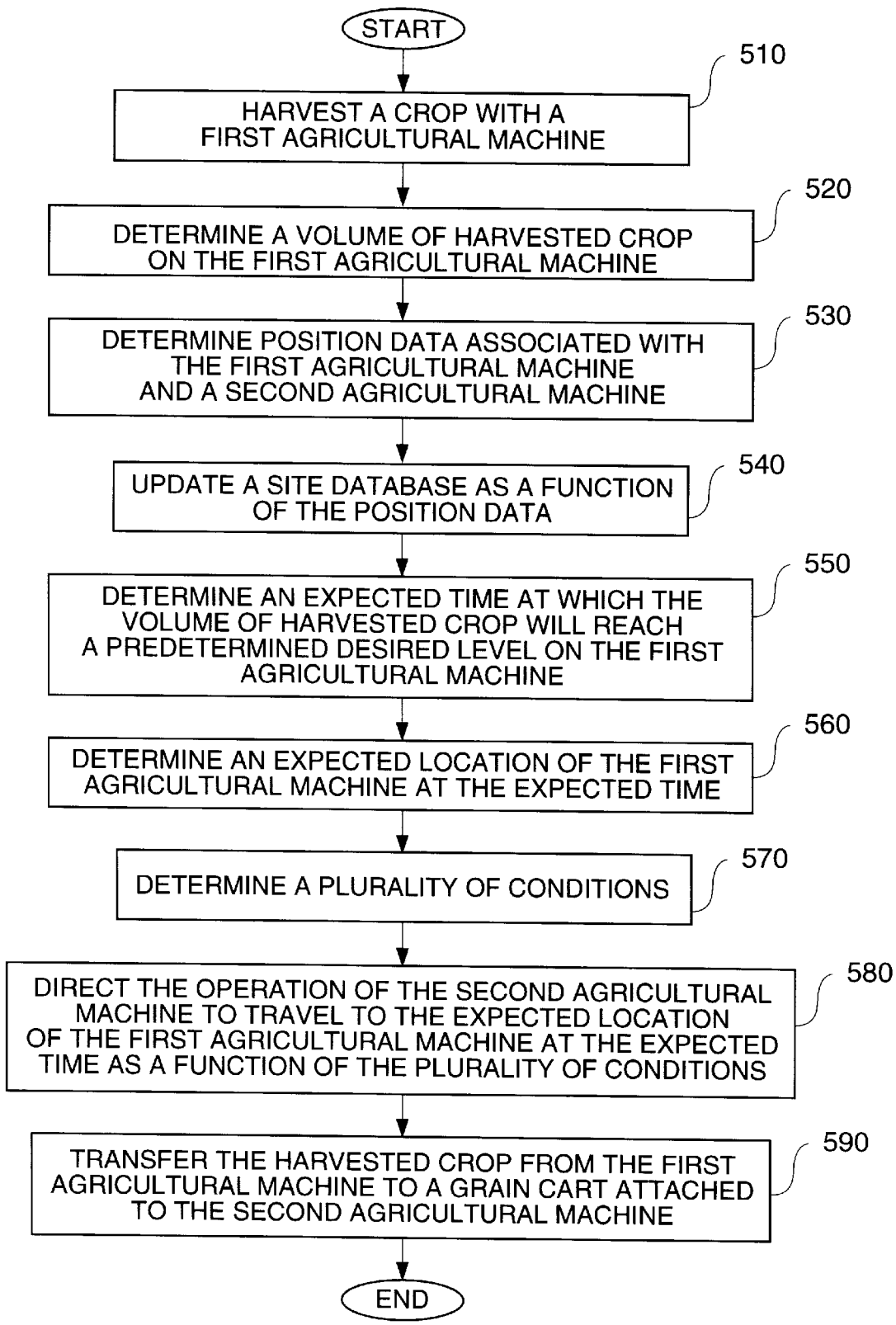

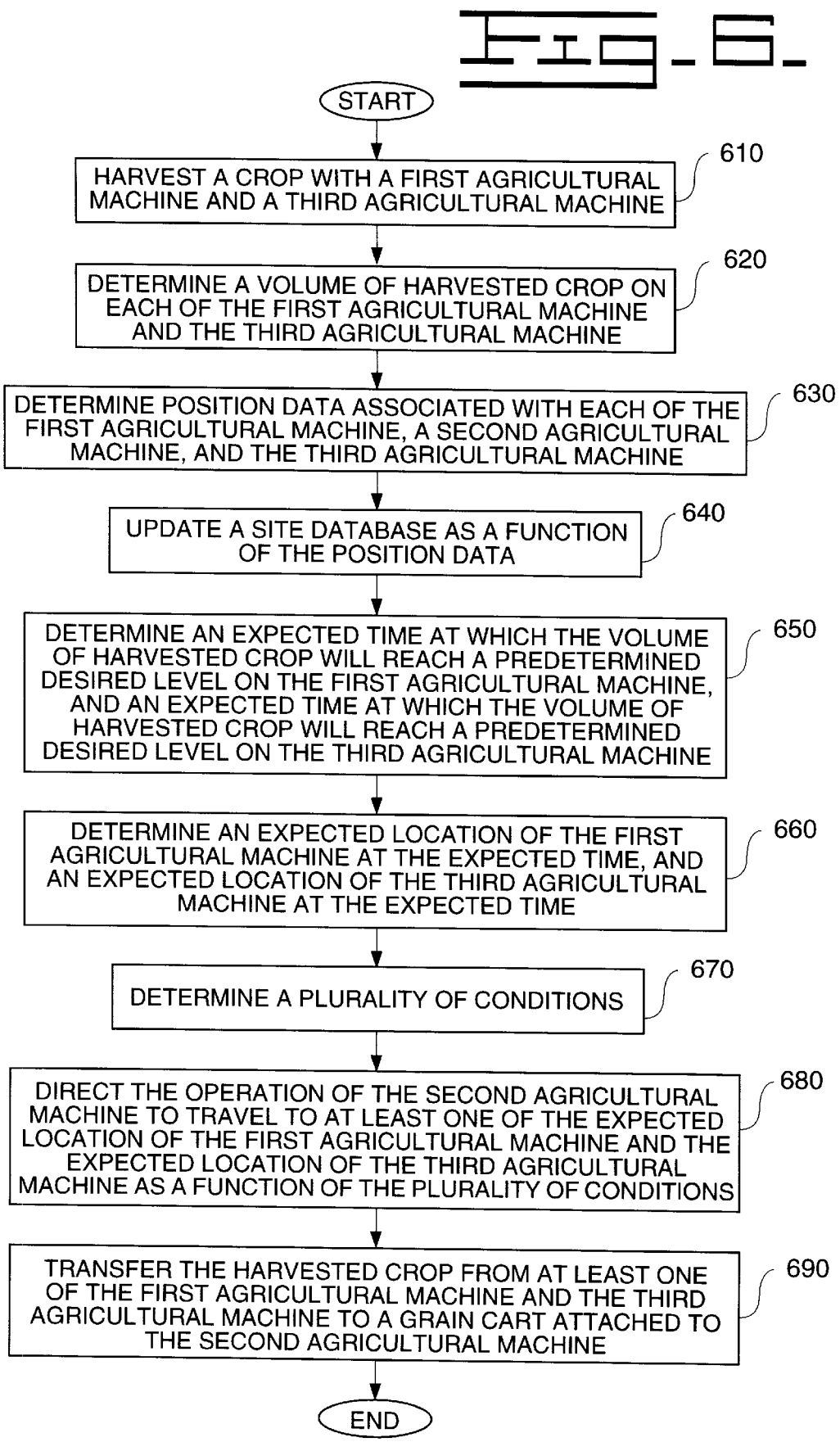

APPARATUS AND METHOD FOR MONITORING AND COORDINATING THE HARVESTING AND TRANSPORTING OPERATIONS OF AN AGRICULTURAL CROP BY MULTIPLE AGRICULTURAL MACHINES ON A FIELD

TECHNICAL FIELD

This invention relates generally to an apparatus and method for monitoring and coordinating the harvesting and transporting operations of an agricultural crop by multiple agricultural machines on a field and, more particularly, to an apparatus and method for determining an expected time at which the harvested crop will reach a predetermined desired level on a first agricultural machine.

BACKGROUND ART

Currently, there has been a large effort to increase the efficiency and productivity of agricultural operations. For example, an agricultural machine, such as a harvester, utilizes a header or other implement to perform various operations, such as harvesting a crop. As the crop is harvested, it is collected in a storage bin or hopper located on the harvester. When the hopper becomes full, the harvested crop is discharged into a grain cart, or truck for transportation to market or other destination.

Traditionally, unloading of the harvested crop in the hopper requires that the harvester be driven to a location outside of the area being harvested, such as to the location of a truck parked on a road near the field, or otherwise the harvester must await the arrival of a transport device such as a grain cart towed by a tractor. In the latter instance, the harvester must cease harvesting when the hopper is full, since more crop cannot be harvested until means are available for unloading the hopper. In either case, harvesting is interrupted when the hopper is full, and resumed once the hopper has been emptied.

It is desirable to provide continuous harvesting, and avoid nonproductive time in which the harvester is idle while waiting to unload the harvested crop in the hopper. In U.S. Pat. No. 4,104,850, Harris discloses a portable grain storage bin which may be located in a field during harvesting of the grain from the field. Harris teaches locating the storage bin in a central location on the field, or nearby the field, thus allowing the harvester and grain carts to discharge the grain into the storage bin if a truck is not available for transporting the grain to the elevator. The storage bin increases the speed of the harvesting since neither the harvester nor tractor pulling a grain cart has to wait for an available truck in order to unload the grain. However, Harris does not disclose providing continuous, uninterrupted harvesting, in which the harvester does not have to deviate from its natural course to unload the harvested crop.

The present invention is directed to overcoming one or more of the problems as set forth above.

DISCLOSURE OF THE INVENTION

In one aspect of the present invention an apparatus for monitoring and coordinating the harvesting and transporting operations of an agricultural crop by multiple agricultural machines on a field is provided. The apparatus includes a first position determining system, a site database, a harvest volume indicating system, and a control system adapted for determining an expected time at which the harvested crop will reach a predetermined desired level on the first agricultural machine.

In another aspect of the present invention a method for monitoring and coordinating the harvesting and transporting operations of an agricultural crop by multiple agricultural machines on a field is provided. The method includes the steps of determining a level of crop harvested by a first agricultural machine, determining position data associated with the first agricultural machine, updating a site database as a function of the position data, and determining an expected time at which the level of harvested crop on the first agricultural machine will reach a predetermined desired level.

BRIEF DESCRIPTION OF THE DRAWINGS

FIG. 5 is a flow diagram illustrating an embodiment of the present invention; and FIG. 6 is a flow diagram illustrating another embodiment of the present invention.

BEST MODE FOR CARRYING OUT THE INVENTION

With reference to FIGS. 1–6, the present invention provides an apparatus and method for monitoring and coordinating the harvesting and transporting operations of an agricultural crop by multiple agricultural machines on an agricultural field 100.

Figure 1:
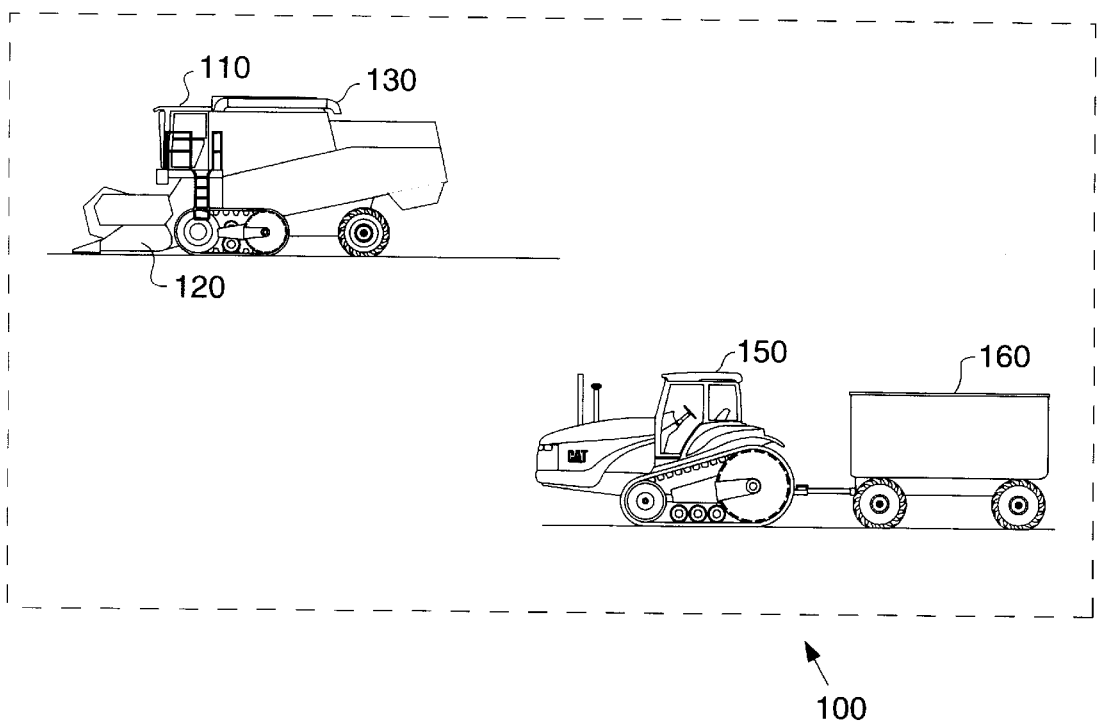
FIG. 1 is a diagrammatic illustration of one aspect of the present invention.

With reference to FIG. 1, a first agricultural machine 110 and a second agricultural machine 150 are shown located in the field 100. The first agricultural machine 110 is a harvester adapted for harvesting the agricultural crop, and the second agricultural machine 150 is a tractor adapted for transporting or hauling the harvested crop. The harvester 110 includes a work implement 120. In the preferred embodiment, the work implement 120 includes a thresher or header for cutting and threshing the crop as the harvester 110 traverses the field 100. However, other types of work implements 120 may be attached to the first agricultural machine 110 in order to perform various agricultural operations.

As the harvester 110 traverses the field 100, the crop is harvested and collected in a storage bin or hopper (not shown) located on the harvester 110. The harvested crop is transferred from the hopper by an auger 130 located on the harvester 110 into a grain cart 160 attached to the tractor 150. As shown in FIG. 1, the grain cart 160 is attached to the tractor 150 in a manner allowing the grain cart 160 to be pulled or towed by the tractor 150. While the following discussion refers to the first agricultural machine as a harvester 110 and the second agricultural machine as a tractor 150, it is to be realized that any number of other types of agricultural machines may be substituted without departing from the spirit of the invention.

Figure 2:
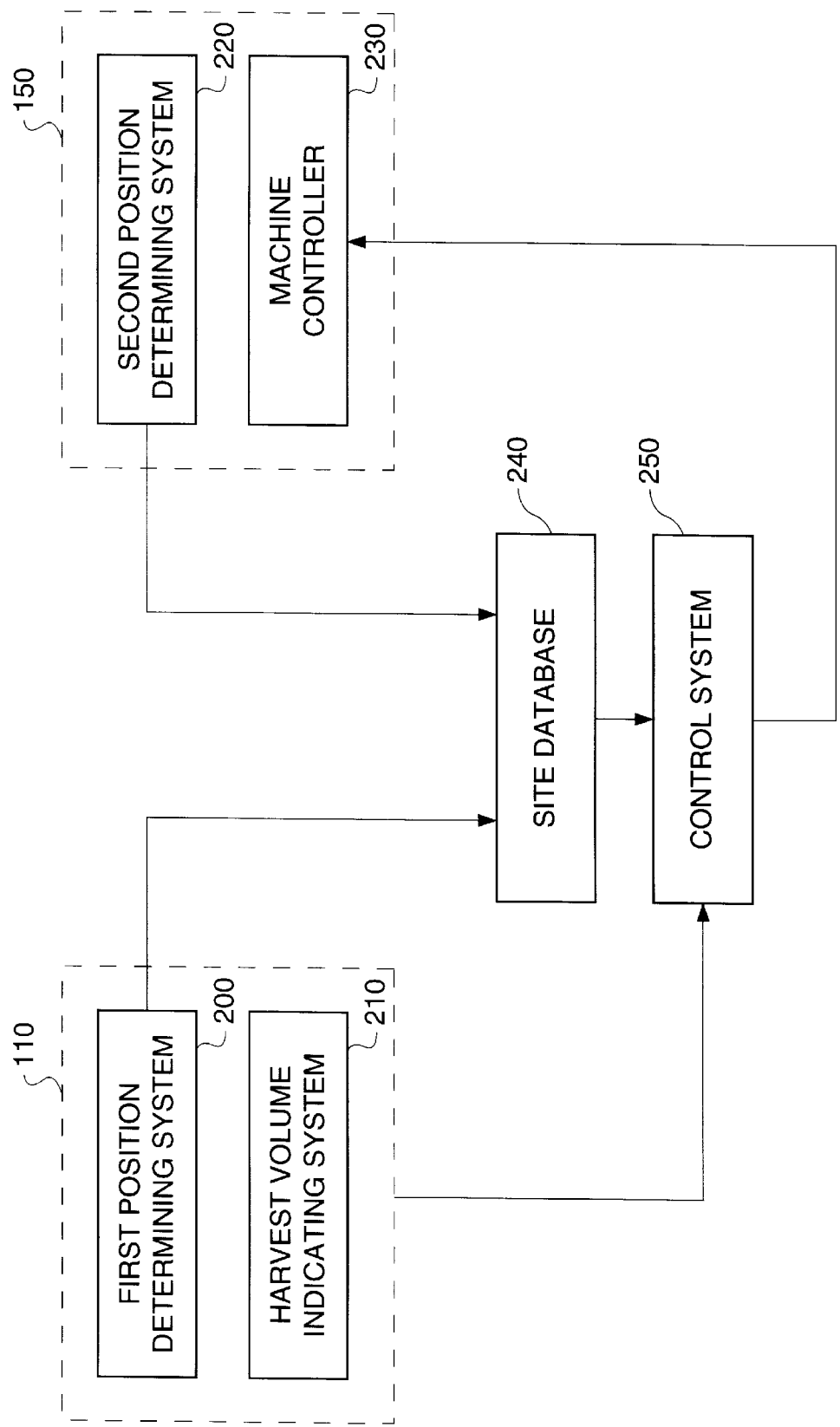
FIG. 2 is a block diagram illustrating an embodiment of the present invention.

Referring to FIG. 2, a first position determining system 200 is shown located on the first agricultural machine 110, and a second position determining system 220 is shown located on the second agricultural machine 150. The first and second position determining systems 200, 220 are each adapted for providing position data associated with the first agricultural machine 110 and the second agricultural machine 150, respectively. The position data includes the instantaneous positions of the first and second agricultural machines 110, 150 in two-dimensional or three-dimensional space, as well as the heading and speed of the first agricultural machine 110 and the second agricultural machine 150, as they traverse the field 100. Preferably, the first and second position determining systems 200, 220 include a GPS receiver. However, other means for determining position data such as radar, laser, dead reckoning, or any combination of position determining means could be used without deviating from the invention.

A site database 240 is provided for storing a dynamic map or model of the agricultural field 100. The dynamic model includes geographic information representing the topography of the field 100. Examples of geographic information include areas of the agricultural field 100 already harvested, obstacles within the field 100 such as rocks or trees, boundaries of the field 100, and the like.

In the preferred embodiment, the site database 240 is located on each of the first and second agricultural machines 110, 150, and is adapted for receiving the position data from each of the first and second position determining systems 200, 220, and responsively updating the dynamic model in real-time as the machines 110, 150 traverse the field 100. Although the site database 240 has been described as being located on both the first and second agricultural machines 110, 150, it is to be understood that the site database 240 may be located remotely from the machines 110, 150, or alternatively located on either one of the first and second agricultural machines 110, 150.

A harvest volume indicating system 210, located on the first agricultural machine 110, is adapted for determining a volume of harvested crop. In the preferred embodiment, the harvest volume indicating system 210 includes an ultrasonic sensor adapted for determining the depth of harvested crop collected in the storage bin or hopper on the first agricultural machine 110.

Alternatively, sensors, positioned at the top and/or bottom of an elevator located on the first agricultural machine 110, may be used to determine the volume of material on each scoop on the elevator. In this manner, the volume of harvested crop is determined as the elevator raises and delivers the harvested crop to the hopper.

As yet another example, optical sensors, strategically positioned at various heights in the hopper on the first agricultural machine 110, may be used to detect the changing volume of harvested crop in the hopper.

It can be appreciated by those skilled in the art that other types of sensors and combinations thereof may be included in the harvest volume indicating system 210 without deviating from the present invention.

The harvest volume indicating system 210 delivers an electrical signal to a control system 250 located on the first agricultural machine 110, indicating the volume of harvested crop on the first agricultural machine 110. In the preferred embodiment, the control system 250 includes a microprocessor. However, a non-microprocessor based control system 250 may be used.

The control system 250 also receives information from the first position determining system 200, the second position determining system 220, and the site database 240. Based on the information received by the first position determining system 200, the second position determining system 220, the site database 240, and the harvest volume indicating system 210, the control system 250 determines an expected time at which the harvested crop will reach a predetermined desired level on the first agricultural machine 110. Preferably, the predetermined desired level is defined as the level at which the hopper on the first agricultural machine 110 is full and ready for unloading.

The control system 250 is further adapted for determining an expected location of the first agricultural machine 110 at the expected time, and responsively determining a plurality of conditions for directing the operation of the second agricultural machine 150 to travel to the expected location of the first agricultural machine 110 at the expected time. The operation of the control system 250 will be discussed in more detail below.

The plurality of conditions includes a desired start time for the second agricultural machine 150 to travel to the expected location of the first agricultural machine 110, and a desired speed of the second agricultural machine 150. Additionally, the plurality of conditions includes a desired path 310 for the second agricultural machine 150 to traverse in order to arrive at the expected location of the first agricultural machine 110 at the expected time. Preferably, the desired path 310 is planned as a path 310 through the area already harvested, so as to not disturb the crops that have yet to be harvested by the first agricultural machine 110, and is a function of the physical dimensions of the second agricultural machine 150 and the geographic limitations of the field 100.

The control system 250 is electrically connected to a machine controller 230 located on the second agricultural machine 150. The machine controller 230 is adapted for receiving the plurality of conditions from the control system 250, and responsively directing the operation of the second agricultural machine 150 to travel to the expected location of the first agricultural machine 110 at the expected time. In the preferred embodiment, the machine controller 230 includes automatic machine controls which allow the second agricultural machine 150 to autonomously travel to the expected location of the first agricultural machine 110 at the expected time. However, the second agricultural machine 150 may also be operated manually by an operator, or semi-autonomously.

An operator display, located on either one or both of the first and second agricultural machines 110, 150, is provided for displaying the dynamic model, including the positions of the first and second agricultural machines 110, 150. In the case of manual operation, the operator display may also be adapted for displaying the plurality of conditions, i.e., the desired start time, the desired speed, and the desired path 310.

Although the control system 250 and site database 240 have been described as being located on at least one of the first agricultural machine 110 and the second agricultural machine 150, one or both elements may be stationed remotely from each of the first and second agricultural machines 110, 150. For example, the control system 250 may be located at a central site office and adapted to communicate with first position determining system 200, the second position determining system 220, the site database 240, and the harvest volume indicating system 210 through a wireless communication link.

Figure 3:
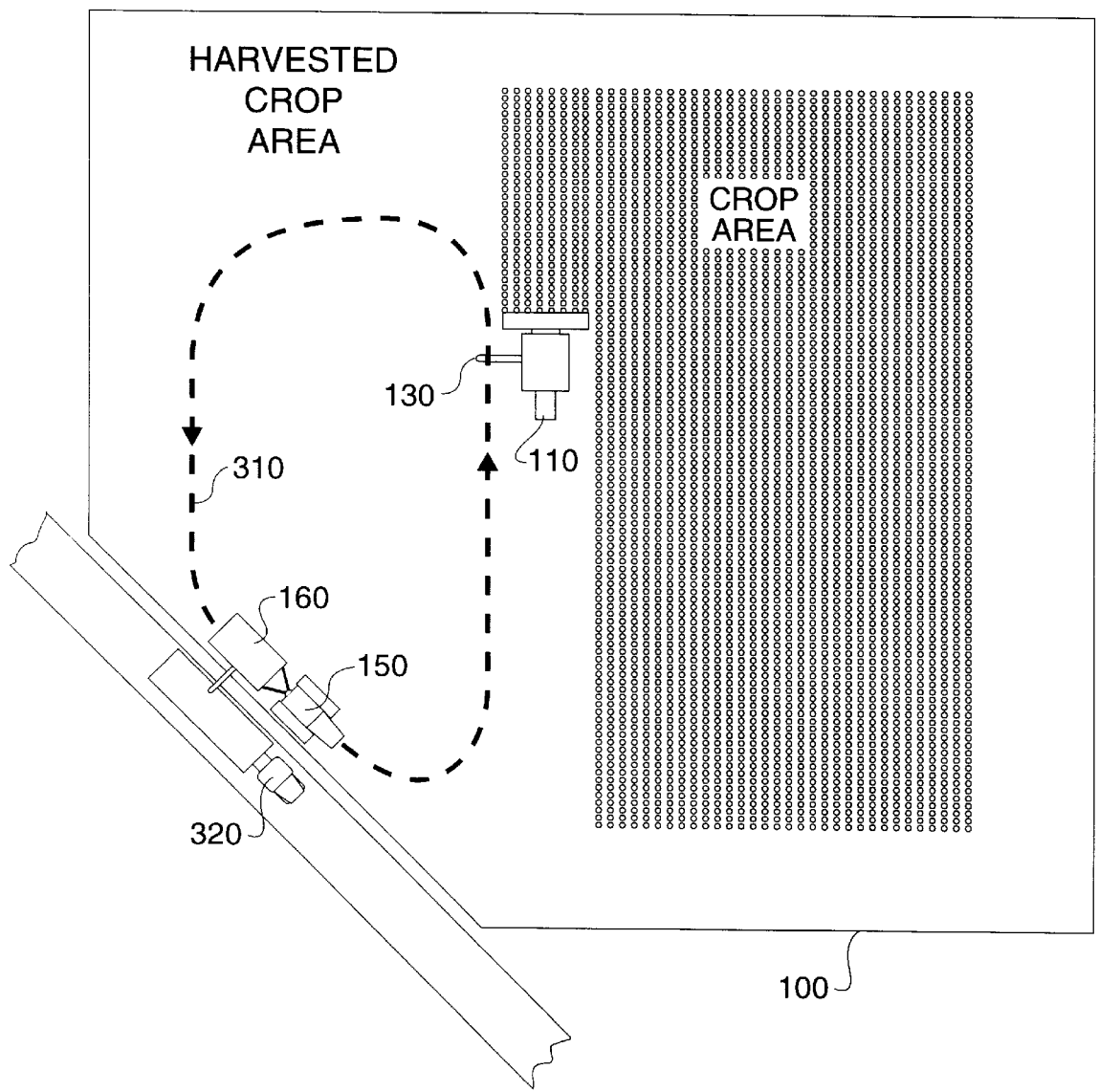
FIG. 3 is a diagrammatic illustration of an embodiment of the present invention.

Referring now to FIG. 3, a diagrammatic illustration of an embodiment of the present invention is shown. As indicated above, the control system 250 determines an expected location of the first agricultural machine 110 at the expected time, and responsively determines a desired path 310 through the area already harvested on the field 100 for the second agricultural machine 150 to traverse. In addition, the control system 250 determines the desired start time for the second agricultural machine 150 to begin to travel to the expected location of the first agricultural machine 110, as well as the desired speed of the second agricultural machine 150. Once the second agricultural machine 150 arrives at the location of the first agricultural machine 110 at the expected time, the harvested crop on the first agricultural machine 110 is discharged through the auger 130 on the first agricultural machine 110 into the grain cart 160 attached to the second agricultural machine 150. After the harvested crop has been transferred to the grain cart 160, the second agricultural machine 150 travels along the desired path 310 to a truck 320 parked on a road or driveway along the side of the field 100, as shown in FIG. 3. The truck 320 is adapted for transporting the harvested crop to market or other destination. After arriving at the location of the truck 320, the harvested crop in the grain cart 160 is transferred into the truck 320. Preferably, there is equipment located on the grain cart 160 for transferring the harvested crop from the grain cart 160.

Figure 4:
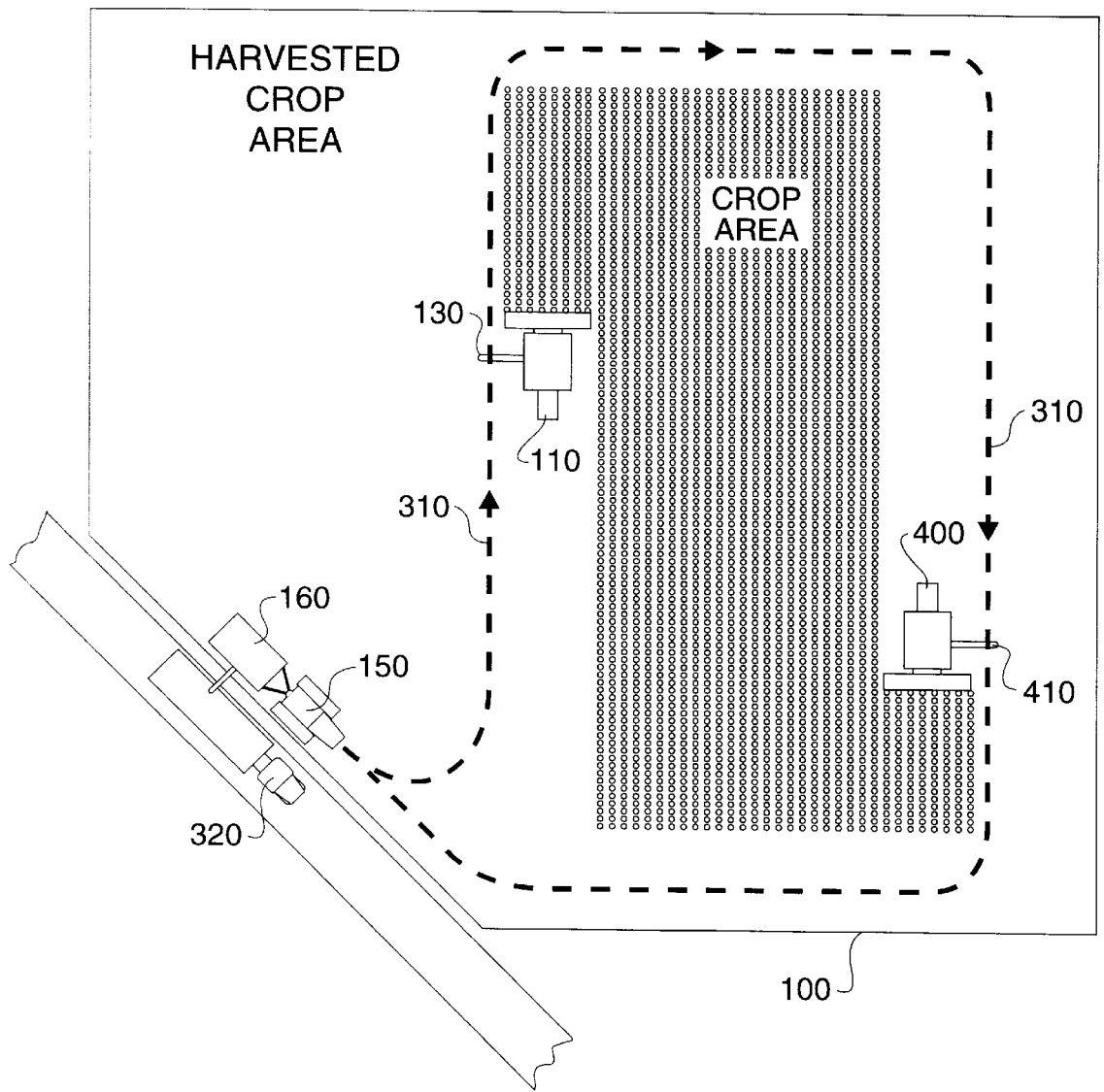
FIG. 4 is a diagrammatic illustration of another embodiment of the present invention.

Referring now to FIG. 4, a diagrammatic illustration of another embodiment of the present invention is shown. A third agricultural machine 400, preferably, a second harvester, is shown located on the field 100. The third agricultural machine 400 includes a harvest volume indicating system 210 located on the third agricultural machine 400 for determining a volume of crop harvested by the third agricultural machine 400, and a third position determining system located on the third agricultural machine 400 for determining position data associated with the third agricultural machine 400. The operation of the third agricultural machine 400 is similar to that of the first agricultural machine 110 and will not be discussed further.

In this embodiment, the control system 250 is adapted for receiving information from the site database 240, the third position determining system located on the third agricultural machine 400, and the harvest volume indicating system 210 located on the third agricultural machine 400, and responsively determining an expected time at which the harvested crop will reach a predetermined desired level on the third agricultural machine 400. The control system 250 is further adapted for determining an expected location of the third agricultural machine 400 at the expected time.

The machine controller 230 receives the information from the control system 250, and responsively directs the operation of the second agricultural machine 150 to travel to one or both of the expected location of the first agricultural machine 110 at the expected time, and the expected location of the third agricultural machine 400 at the expected time.

As an example, if the volume of harvested crop on the first agricultural machine 110 reaches the predetermined desired level before the volume of harvested crop on the third agricultural machine 400, probably due to faster harvesting by the first agricultural machine 110, or a larger storage capacity or hopper, on the third agricultural machine 400, the machine controller 230 will direct the second agricultural machine 150 to travel to the expected location of the first agricultural machine 110 at the expected time, and discharge the harvested crop through auger 130 into the grain cart 160. As shown in FIG. 4, the machine controller 230 then directs the second agricultural machine 150 to travel to the expected location of the third agricultural machine 400 at the expected time, and discharge the harvested crop through auger 410 into the grain cart 160.

It is to be understood that the grain cart 160 may have a capacity of two to three times that of the hoppers on the first and third agricultural machines 110, 400, respectively, and thus the grain cart 160 may be able to store the crop harvested by multiple agricultural machines before needing to unload.

With reference to FIG. 5, a flow diagram is shown illustrating the operation of an embodiment of the present invention.

In a first control block 510, the crop is harvested by a first agricultural machine 110 and collected in a hopper located on the first agricultural machine 110.

In a second control block 520, a volume of harvested crop on a first agricultural machine 110 is determined. The volume of harvested crop is determined as a function of a harvest volume indicating system 210 located on the first agricultural machine 110.

In a third control block 530, position data associated with the first agricultural machine 110 and a second agricultural machine 150 is determined. A site database which stores a dynamic model of the field 100 is updated as a function of the position data in a fourth control block 540.

Control then proceeds to a fifth control block 550 and a sixth control block 560. In the fifth control block 550, a control system 250 determines an expected time at which the volume of harvested crop will reach a predetermined desired level on the first agricultural machine 110. In the sixth control block 560, the control system 250 determines an expected location of the first agricultural machine 110 at the expected time.

In a seventh control block 570, a plurality of conditions are determined by the control system 250. In an eighth control block 580, a machine controller 250 directs the operation of the second agricultural machine 150 to travel to the expected location of the first agricultural machine 110 as a function of the plurality of conditions.

Control then proceeds to a ninth control block 590, where the harvested crop on the first agricultural machine 110 is transferred to a grain cart 160 attached to the second agricultural machine 150.

With reference to FIG. 6, a flow diagram is shown illustrating the operation of another embodiment of the present invention.

In a first control block 610, the crop is harvested by a first agricultural machine 110 and a third agricultural machine 400.

In a second control block 620, a volume of harvested crop on each of the first agricultural machine 110 and the third agricultural machine 400 is determined.

In a third control block 630, position data associated with the first agricultural machine 110, a second agricultural machine 150, and the third agricultural machine 400 is determined. A site database which stores a dynamic model of the field 100 is updated as a function of the position data in a fourth control block 640.

Control then proceeds to a fifth control block 650 and a sixth control block 660. In the fifth control block 650, a control system 250 determines an expected time at which the volume of harvested crop will reach a predetermined desired level on the first agricultural machine 110, and an expected time at which the volume of harvested crop will reach a predetermined desired level on the third agricultural machine 400. In the sixth control block 660, the control system 250 determines an expected location of the first agricultural machine 110 at the expected time, and an expected location of the third agricultural machine 400 at the expected time.

In a seventh control block 670, a plurality of conditions are determined by the control system 250. In an eighth control block 680, a machine controller 250 directs the operation of the second agricultural machine 150 to travel to at least one of the expected location of the first agricultural machine 110, and the expected location of the third agricultural machine 400 as a function of the plurality of conditions.

Control then proceeds to a ninth control block 690, where the harvested crop on at least one of the first agricultural machine 110 and the third agricultural machine 400 is transferred to a grain cart 160 attached to the second agricultural machine 150.

Industrial Applicability

As one example of an application of the present invention, harvesters are used generally to harvest a crop, such as grain, wheat, or hay. In such applications, the harvester 110 utilizes a header or other implement to cut and thresh the crop as the harvester traverses a field 100. As the crop is harvested, it is collected within a storage bin or hopper located on the harvester, and the volume of harvested crop is determined. When the hopper becomes full, the harvested crop is transferred into a grain cart or other transport device.

The present invention determines an expected time at which the volume of harvested crop on the harvester 110 will reach a predetermined desired level, e.g., maximum capacity, and an expected location of the harvester 110 at the expected time is determined. The control system 250 determines a desired start time, desired speed, and desired path 310 for a tractor 150 pulling a grain cart 160 to travel to the expected location of the harvester 110 at the expected time. Upon arrival of the tractor 150 at the expected location of the harvester 110, the harvested crop is transferred into the grain cart 160.

The present invention anticipates the expected time at which the hopper on the harvester 110 will be full and ready for unloading, and further determines an expected location of the harvester 110 at the expected time, so that a tractor 150 pulling a grain cart 160 will be available for unloading of the harvested crop. Since the harvester 110 does not have to stop harvesting in order to wait for the tractor 150, the harvester 110 is allowed to continuously harvest the crop, thus greatly increasing the amount of crop that can be harvested in a day.

Other aspects, objects, and features of the present invention can be obtained from a study of the drawings, the disclosure, and the appended claims.

What is claimed is:

1. An apparatus for monitoring and coordinating the harvesting and transporting operations of an agricultural crop by multiple agricultural machines on a field, comprising:

a first position determining system located on a first agricultural machine;

a site database adapted for storing a dynamic model of the field;

a harvest volume indicating system located on the first agricultural machine; and a control system for receiving information from the first position determining system, the site database, and the harvest volume indicating system, and responsively determining an expected time at which the harvested crop would reach a predetermined desired level on the first agricultural machine and wherein the control system is adapted for determining an expected location of the first agricultural machine at the expected time.

2. An apparatus, as set forth in claim 1, further including a second position determining system located on a second agricultural machine, wherein the control system is adapted for receiving information from the second position determining system.

3. An apparatus, as set forth in claim 2, wherein each of the first position determining system and the second position determining system includes a GPS receiver.

4. An apparatus, as set forth in claim 2, wherein the information received from each of the first and second position determining systems includes position data.

5. An apparatus, as set forth in claim 4, wherein the position data includes position, speed, and heading of each of the first and second agricultural machines.

6. An apparatus, as set forth in claim 2, further including a machine controller located on the second agricultural machine, the machine controller being adapted for receiving a plurality of conditions from the control system, and responsively directing the operation of the second agricultural machine to travel to the expected location of the first agricultural machine at the expected time.

7. An apparatus, as set forth in claim 6, wherein the plurality of conditions includes a desired start time for the second agricultural machine to travel to the expected location of the first agricultural machine.

8. An apparatus, as set forth in claim 6, wherein the plurality of conditions includes a desired speed of the second agricultural machine.

9. An apparatus, as set forth in claim 6, wherein the plurality of conditions includes a desired path for the second agricultural machine to traverse to arrive at the expected location of the first agricultural machine at the expected time.

10. An apparatus, as set forth in claim 2, further including an operator display located on at least one of the first agricultural machine and the second agricultural machine.

11. An apparatus, as set forth in claim 10, wherein the operator display is adapted to display the dynamic model.

12. An apparatus, as set forth in claim 6, wherein the machine controller is adapted to autonomously control the operation of the second agricultural machine.

13. An apparatus, as set forth in claim 2, wherein the site database is adapted for receiving information from the first position determining system and the second position determining system, and responsively updating the dynamic model.

14. An apparatus, as set forth in claim 1, wherein the site database is located on at least one of the first agricultural machine and the second agricultural machine.

15. An apparatus, as set forth in claim 1, wherein the site database is located remote from the first agricultural machine and the second agricultural machine.

16. An apparatus, as set forth in claim 1, wherein the harvest volume indicating system includes an ultrasonic sensor adapted for determining a volume of the harvested crop.

17. An apparatus, as set forth in claim 2, wherein the control system is located remote from the first agricultural machine and the second agricultural machine, the control system being adapted to receive information from the first position determining system, the second position determining system, the site database, and the harvest volume indicating system through a wireless communication link.

18. An apparatus, as set forth in claim 1, wherein the first agricultural machine is a harvester.

19. An apparatus, as set forth in claim 1, wherein the second agricultural machine is a machine adapted to haul the harvested crop.

20. An apparatus, as set forth in claim 19, wherein the machine adapted to haul the harvested crop is a tractor pulling a grain cart.

21. An apparatus, as set forth in claim 6, further including a third position determining system located on a third agricultural machine, and a harvest volume indicating system located on the third agricultural machine.

22. An apparatus, as set forth in claim 21, wherein the third agricultural machine is a second harvester.

23. An apparatus, as set forth in claim 21, wherein the control system is adapted for receiving information from the third position determining system, the harvest volume indicating system located on the third agricultural machine, and the site database, and responsively determining an expected time at which the harvested crop will reach a predetermined desired level on the third agricultural machine, the control system being further adapted for determining an expected location of the third agricultural machine at the expected time.

24. An apparatus, as set forth in claim 23, wherein the machine controller is adapted for directing the operation of the second agricultural machine to travel to at least one of the expected location of the first agricultural machine and the expected location of the third agricultural machine.

25. A method for monitoring and coordinating the harvesting and transporting operations of an agricultural crop by multiple agricultural machines on a field, comprising the steps of:
   determining a level of crop harvested by a first agricultural machine;
   determining position data associated with the first agricultural machine;
   updating a site database as a function of the position data; and
   determining an expected time at which the level of harvested crop will reach a predetermined desired level on the first agricultural machine and determining an expected location of the first agricultural machine at the expected time.

26. A method, as set forth in claim 25, wherein determining the level of harvested crop includes determining a volume of crop harvested by the first agricultural machine.

27. A method, as set forth in claim 25, wherein determining position data further includes determining position data associated with each of the first agricultural machine and a second agricultural machine.

28. A method, as set forth in claim 27, wherein determining position data includes determining position, speed, and heading of each of the first and second agricultural machines.

29. A method, as set forth in claim 27, further including the step of determining a plurality of conditions, and responsively directing the operation of the second agricultural machine to travel to the expected location of the first agricultural machine at the expected time.

30. A method, as set forth in claim 29, wherein determining the plurality of conditions includes determining a desired start time for the second agricultural machine to travel to the expected location of the first agricultural machine.

31. A method, as set forth in claim 29, wherein determining the plurality of conditions includes determining a desired speed of the second agricultural machine.

32. A method, as set forth in claim 29, wherein determining the plurality of conditions includes determining a desired path for the second agricultural machine to traverse to arrive at the expected location of the first agricultural machine at the expected time.

33. A method, as set forth in claim 29, further including the step of displaying a dynamic model on an operator display located on at least one of the first agricultural machine and the second agricultural machine.

34. A method, as set forth in claim 29, wherein directing the operation of the second agricultural machine includes autonomously controlling the second agricultural machine.

35. A method, as set forth in claim 29, further including the step of transferring the harvested crop from the first agricultural machine to the second agricultural machine, in response to the second agricultural machine arriving at the first agricultural machine.

36. A method, as set forth in claim 29, further including the steps of:
   determining a level of crop harvested by a third agricultural machine;
   determining position data associated with the third agricultural machine;
   determining an expected time at which the harvested crop will reach a predetermined desired level on the third agricultural machine; and
   determining an expected location of the third agricultural machine at the expected time.

37. A method, as set forth in claim 36, further including the step of directing the operation of the second agricultural machine to travel to at least one of the expected location of the first agricultural machine and the expected location of the third agricultural machine.

38. An apparatus for monitoring and coordinating the harvesting and transporting operations of an agricultural crop by multiple agricultural machines on a field, comprising:
   means for determining a level of crop harvested by a first agricultural machine;
   means for determining position data associated with each of a first agricultural machine and a second agricultural machine;
   means for updating a site database as a function of the position data; and
   means for determining an expected time at which the level of harvested crop will reach a predetermined desired level on the first agricultural machine;
   means for determining an expected location of the first agricultural machine at the expected time;
   means for directing the operation of the second agricultural machine to travel to the expected location of the first agricultural machine at the expected time.

39. An apparatus, as set forth in claim 38, further including:
   means for determining a level of crop harvested by a third agricultural machine;
   means for determining position data associated with the third agricultural machine;
   means for determining an expected time at which the harvested crop will reach a predetermined desired level on the third agricultural machine; and
   means for determining an expected location of the third agricultural machine at the expected time.

40. A method, as set forth in claim 39, further including means for directing the operation of the second agricultural machine to travel to at least one of the expected location of the first agricultural machine and the expected location of the third agricultural machine.

41. An apparatus for monitoring and coordinating the harvesting and transporting operations of an agricultural crop by multiple agricultural machines on a field, comprising:

- a first position determining system located on a first agricultural machine;
- a second position determining system located on a second agricultural machine;
- a third position determining system located on a third agricultural machine;
- a site database adapted for storing a dynamic model of the field;
- a harvest volume indicating system located on each of the first agricultural machine and the third agricultural machine;
- a control system for receiving information from each of the first position determining system, the second position determining system, the third position determining system, the site database, the harvest volume indicating system located on the first agricultural machine, and the harvest volume indicating system located on the third agricultural machine, and responsively determining an expected time at which the harvested crop will reach a predetermined desired level on each of the first agricultural machine and the third agricultural machine, the control system being further adapted for determining an expected location of the first agricultural machine at the expected time and an expected location of the third agricultural machine at the expected time; and
- a machine controller adapted for directing the operation of the second agricultural machine to travel to at least one of the expected location of the first agricultural machine and the expected location of the third agricultural machine.

42. A method for monitoring and coordinating the harvesting and transporting operations of an agricultural crop by multiple agricultural machines on a field, comprising the steps of:

- determining a level of crop harvested by a first agricultural machine;
- determining a level of crop harvested by a third agricultural machine
- determining position data associated with each of the first agricultural machine, the third agricultural machine, and a second agricultural machine;
- updating a site database as a function of the position data;
- determining an expected time at which the harvested crop will reach a predetermined desired level on the first agricultural machine;
- determining an expected location of the first agricultural machine at the expected time;
- determining an expected time at which the harvested crop will reach a predetermined desired level on the third agricultural machine;
- determining an expected location of the third agricultural machine at the expected time; and
- directing the operation of the second agricultural machine to travel to at least one of the expected location of the first agricultural machine and the expected location of the third agricultural machine.

* * * * *